C. H. NYE AND R. W. BEARDSLEY.
STOCK FEEDER.
APPLICATION FILED MAR. 4, 1916.

1,315,855.

Patented Sept. 9, 1919.

Witnesses
R. Stanton
J. J. Klunegan

Inventor
R. W. Beardsley.
C. H. Nye.
By
Attorney

UNITED STATES PATENT OFFICE.

CARL HENRY NYE AND ROBERT WILLIAM BEARDSLEY, OF MARIETTA, OHIO.

STOCK-FEEDER.

1,315,855.  Specification of Letters Patent.  Patented Sept. 9, 1919.

Application filed March 4, 1916. Serial No. 82,160.

*To all whom it may concern:*

Be it known that we, CARL H. NYE and ROBERT W. BEARDSLEY, citizens of the United States, residing at Marietta, in the county of Washington and State of Ohio, have invented certain new and useful Improvements in Stock-Feeders; and do hereby declare the following to be a full, clear, and exact description of the invention, such as will enable others skilled in the art to which it appertains to make and use the same.

The object of this invention is to provide a novel type of feeding device for stock, especially calves, which will be of simple construction, cheap to manufacture, will be durable and efficient and of such construction that the same can be conveniently cleaned so as to be kept in a sanitary condition.

Other objects will appear and be better understood from that embodiment of our invention of which the following is a specification, reference being had to the accompanying drawings forming a part thereof, in which.

Figure 1:
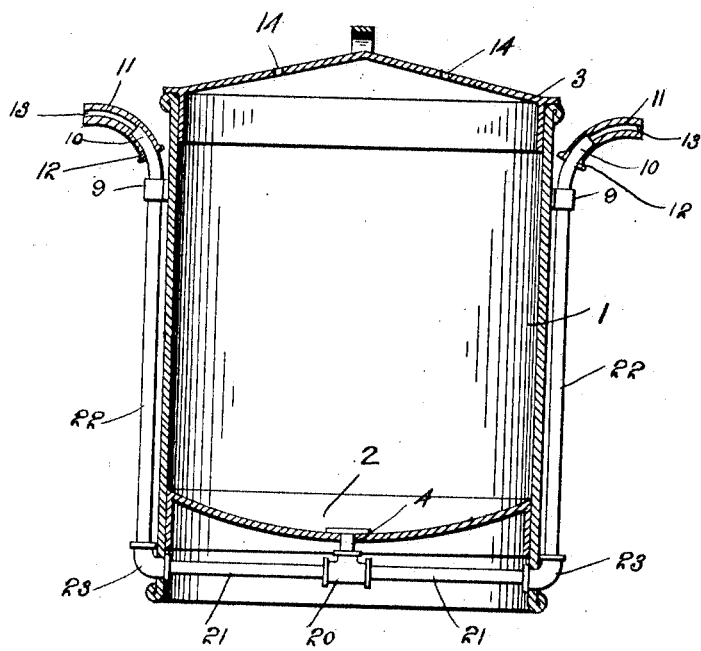
Figure 1 is a central vertical section through the feeder.
Figure 2:
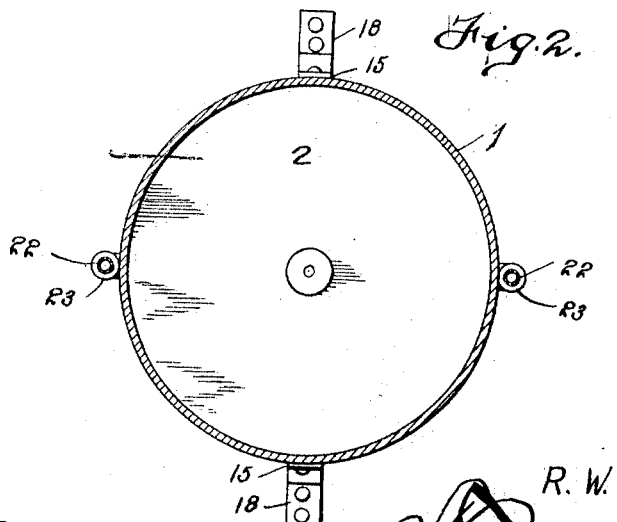
Fig. 2 is a horizontal sectional view of the same.

Referring to the drawings more in detail, the numeral 1 designates a cylindrical receptacle designed to hold the liquid food for the live stock, the said receptacle 1 having a bottom wall 2, which is of concavo convex configuration and positioned above the lower end of the receptacle 1, the said bottom wall 2 having its concave face disposed upwardly. A removable cover 3 closes the upper end of the receptacle 1 and is of such construction as to prevent the entrance of foreign matter to the interior of the receptacle.

The bottom wall 2 is centrally provided with an opening for the reception of one end of a vertical pipe 4, the lower end of the pipe 4 being received by a T 20, receiving horizontally disposed pipes 21, the outer ends of the horizontally disposed pipes 21 being received by the horizontally disposed arms of elbows 23, the said horizontal arms of the elbows extending through openings in the wall of the receptacle, adjacent the lower end of the receptacle, and the other arms of the elbows extending vertically and receiving the lower ends of vertically disposed pipes 22, the said pipes 22 extending upwardly to a point adjacent the upper end of the receptacle 1 and through brackets 9, which are located on the outer surface of the receptacle 1 at a point adjacent the upper end thereof, so as to hold the pipes in position. The upper end of each pipe is extended angularly, as shown at 10, and is received by the bore 11 of a nipple 12, the said nipple being held to the pipe 10 in any suitable manner. The outer end of the bore 11 of the nipple 12 is restricted, as shown at 13, so as to prevent the passage of too large a volume of liquid through the nipple at one time.

The cover 3 is provided with openings 14 to admit of the passage of air into the receptacle 1 so as to facilitate the flow of the liquid therefrom.

The lower end of the receptacle 1 is provided with diametrically opposite brackets 15, each having one arm bent to provide a U-shaped hook portion. The receptacle 1 is adapted to be mounted upon a support, and the said support is provided with angular brackets 18, coöperating with brackets 15 for securing the receptacle to the support so as to hold the receptacle 1 against movement during the feeding of the live stock.

The substantially U-shaped pipe frame composed of the pipes 22 and 21, has its bight portion tightly secured to the bottom of the receptacle by the relatively short pipe 4 and its vertical arms 22 secured to the outer surface of the body at diametrically opposite points thereof and serves to materially reinforce and brace the structure as a whole while also providing means whereby the contents of the receptacle may be readily removed through the vertical arms 22 and the nipples 12 secured on the upper ends thereof.

Having thus described our invention what we claim as new, is:

In a device of the character stated, a cylindrical receptacle provided with a bottom having its upper surface concave, said bottom being positioned above the lower end of the body of said receptacle, a U-shaped pipe frame having its bight portion extending beneath said bottom diametrically thereof and its vertical arms extending closely adjacent the outer face of the receptacle and secured thereto, the bight portion of said frame fitting snugly through the lower portion of the body of the receptacle so as to be held in position thereby, a pipe carried by the bight portion of the pipe frame centrally thereof and secured through the center of said bottom, said pipe and the frame coöperating with the receptacle to brace the structure as a whole while also providing means for permitting removal of the contents of the receptacle through both vertical arms of the frame, and nipples secured upon the upper ends of the arms of said frame.

In testimony whereof we affix our signatures in presence of two witnesses.

CARL HENRY NYE.
ROBERT WILLIAM BEARDSLEY.

Witnesses:
C. T. O'NEILL,
L. T. O'NEILL.